(No Model.)
V. OSTER.
WATER FILTER AND PURIFIER.
No. 457,008. Patented Aug. 4, 1891.
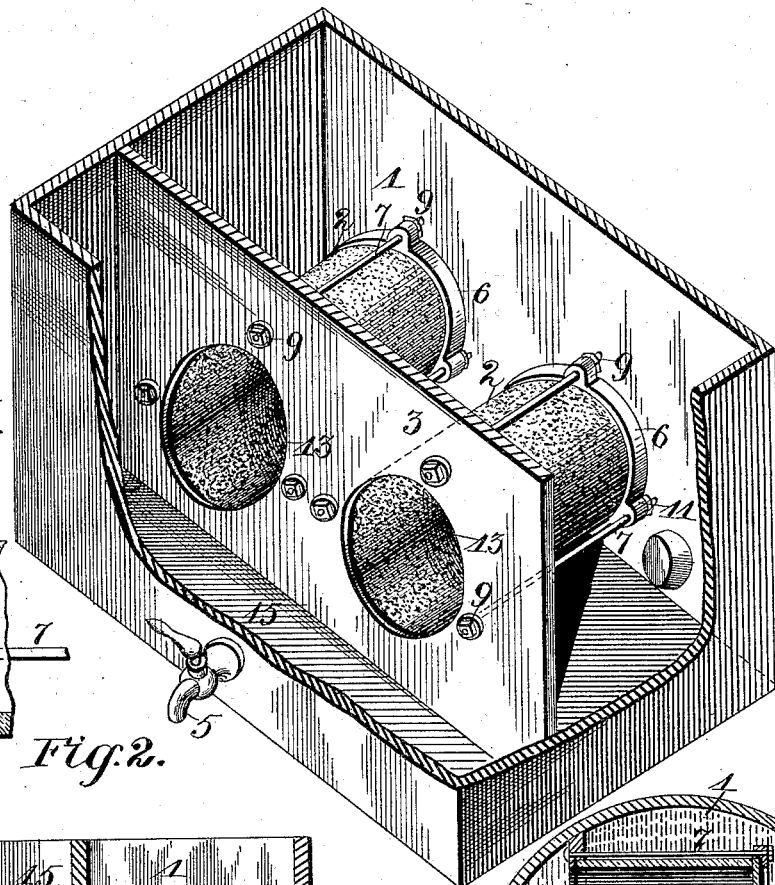
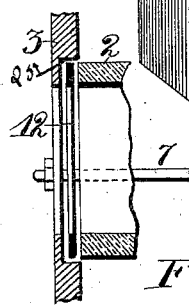
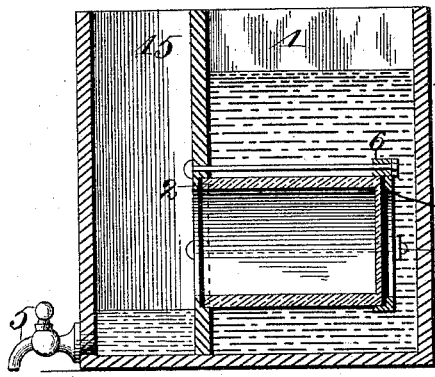
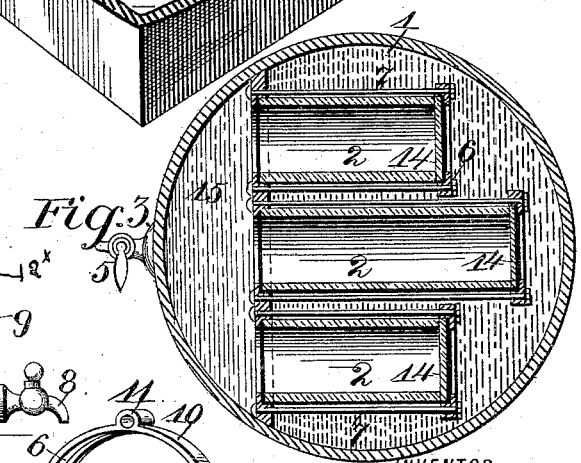
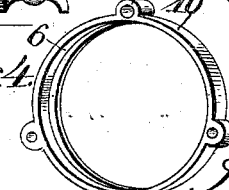
WITNESSES:
INVENTOR
Valentine Oster.
BY
Higdon & Higdon
ATTORNEYS.

UNITED STATES PATENT OFFICE.

VALENTINE OSTER, OF ST. LOUIS, MISSOURI.

WATER FILTER AND PURIFIER.

SPECIFICATION forming part of Letters Patent No. 457,008, dated August 4, 1891.

Application filed August 27, 1890. Serial No. 363,209. (No model.)

*To all whom it may concern:*

Be it known that I, VALENTINE OSTER, of St. Louis, in the State of Missouri, have invented certain new and useful Improvements in Water Filters and Purifiers, of which the following is a full, clear, and exact description, reference being had to the accompanying drawings, forming a part thereof.

My invention relates to improvements in water filters and purifiers; and it consists in the novel arrangement and combination of parts, as will be more fully described, and designated in the claims.

The object of my invention is to remove all animal and mineral impurities from water, rendering it as nearly chemically pure as possible. I attain this object by filtering the water through porous horizontally-suspended and submerged pipes or tubes, leaving the sediments and impurities in the form of a precipitate on the surface of the tubes, which finally find their way to the bottom of the tank, and may be there removed by any suitable opening for that purpose. The animal and mineral impurities are entirely removed from the water, and the filtered water is brought in contact with pure air, which is admitted through the open ends of the filtering pipes or tubes.

In the drawings, Figure 1 is a perspective view of my invention with a section of the tank broken away, showing the inner construction and arrangements of parts. Fig. 2 is a vertical section of the same. Fig. 3 is a horizontal section of a modification of my invention. Fig. 4 is a perspective view of the metallic annulus or retaining device for tubes. Fig. 5 is a vertical section of the diaphragm or division-wall, open end of tube, and rubber annulus detached.

Referring to the drawings, 1 represents an ordinary water-tank, with a division-wall or diaphragm 3, which divides said tank into two compartments 1 and 15. The diaphragm 3 is secured in said tank so as to form water-tight compartments. In said diaphragm circular perforations 13 are formed, around the inner side of which rabbets are made for the reception of tubes 2. Around the margin of said perforations smaller ones are made and arranged triangularly, through which retaining-rods 7 for said tubes pass. Upon the ends of said cylindrical tubes metallic annuli 10, having perforated ears 11 and rabbets formed therein, are fitted. In said rabbets rubber annuli or other packings $12^\times$ are located. The retaining-rods 7 are provided with nuts 9.

2 represents one or a series of porous pipes or tubes, which are used for filtering purposes. Said tubes are placed in rabbets formed in the perforations made in the diaphragm, and by means of the retaining-rods 7, passing through small perforations in said diaphragm and through perforated ears of the metallic annuli 10, are firmly secured by tightening the nuts 9, and are thereby horizontally suspended and submerged in the tank. Said tubes may be made of any porous substance. An unglazed earthen tube having fine pores answers the purpose. The substance out of which the tubes are made should be compressed sufficiently as to render the pores or capillaries very small, so that nothing but molecules of water can pass through them. The tubes are used because they present a greater superficial area than any other geometrical form.

The tubes 2 are arranged horizontally and suspended from the diaphragm 3 in water, but they may as well be horizontally suspended from the tank-walls at a distance therefrom. The water to be filtered is received in compartment 1 and may flow freely around said tubes. Any purifying substance—such as powdered charcoal—can be thrown therein, and will be filtered out and left in the form of a precipitation with other sediments and impurities. The process of filtration takes place slowly, sufficiently slow to remove all impurities, the rapidity of percolation depending upon the density of the filtering-tubes and the quantity of water in the tank, which varies the pressure on said tubes—for instance, if the tank is full of water the pressure is great and percolation takes place comparatively fast, and so on. The size of the tank and the number and size and length of the tubes depend on the quantity of water to be filtered.

I first ascertain the quantity of water to be filtered per diem, then find out by experiment how much water will percolate through one superficial foot of tubing and divide the last amount into the quantity of water, which gives the number of square feet required, after which I may use such a number of tubes of the required size as will correspond to the number of square feet. For instance, if twenty square feet is required to filter the water I desire to be filtered, and I wish to construct tubes having like area—say of three feet in length—I divide the area—twenty square feet—by three and the quotient by 3.1416, and I have the diameter of the tube I wish to construct. Having constructed tubes of the required size, they are next suspended and submerged in the tank, as before stated. The open ends of the tubes are placed in the rabbets 25 of the openings 13, and in said rabbets a rubber annulus 12 is located, so as to form a water-tight joint, also as before stated. At the closed end another rubber annulus is located between said closed end and the metallic annulus for the purpose of affording a soft packing. In place of using a closed integral end, one end of the tube may be closed by means of clamping a porous plate 14 thereto by means of retaining-rods 7. The water percolates through the pores of the tubes and appears on the inside of said tubes in a thin sheet, and in this manner the filtered water in the form of a thin stratum is brought in intimate contact with air, which is admitted on the inside of the tubes through their open ends. The effect of pure air on water is well understood—the chemical affinity of the hydrogen and oxygen repels other atoms and molecules, which usually in the case of water consist of animal impurities. The percolated water trickles down the inside of the tubes and collects in the bottom thereof and flows out into the filtered-water compartment 15, and from there is removed to any desired vessel by means of a faucet 5. The sediments and heavy impurities settle to the bottom of the tank, and from thence can be removed by any suitable opening 8. The precipitates collect on the exterior surface of the tubes and are very easily washed off. The pores of the tubes are made so minute by compression that they allow nothing but the molecules of water to penetrate.

When a film forms on the exterior surface of the tubes, in order to cleanse it therefrom simply unloose the nuts 9, revolve said tube, and wash it, or the tubes can be entirely removed and then washed.

Having fully described my invention, what I claim is—

1. The improved water filter and purifier consisting of a tank, a partition-wall secured therein, a porous tube having a closed inner end and horizontally suspended from said partition-wall, a rabbeted annulus having perforated ears upon the free outer end of said tube, and a series of retaining-rods having threads and nuts, substantially as set forth.

2. A water-filter consisting of a tank, a partition-wall secured therein, apertures in said wall, rabbets formed around the apertures, porous filtering-tubes having closed inner ends secured to said wall, rabbeted annuli having ears upon the free outer end of said tubes, packing-rings between said annuli and tubes and between the tubes and the rabbets of the partition, and a series of retaining-rods, substantially as described.

In testimony whereof I affix my signature in presence of two witnesses.

VALENTINE OSTER.

Witnesses:
 JNO. C. HIGDON,
 C. F. KELLER.